3,448,095
PROCESS AND CATALYTIC COMPOSITIONS FOR THE POLYMERIZATION AND COPOLYMERIZATION OF CONJUGATED DIENES AND THE PRODUCTS THEREOF
Francois Dawans, Bougival, Yvelines, and Philippe Teyssie, Le Vesinet, Yvelines, France, assignors to Institut Francais du Petrole des Carburants et Lubrifiants, Rueil-Malmaison, Hauts-de-Seine, France
No Drawing. Filed Oct. 19, 1966, Ser. No. 587,692
Claims priority, application France, Oct. 22, 1965, 36,006
Int. Cl. C08c 1/14, 3/10, 3/12
U.S. Cl. 260—94.3                    15 Claims

ABSTRACT OF THE DISCLOSURE

A polymer of a conjugated diolefin, particularly isoprene, having a substantially regular chain of vinyl and cis-1,4 units, comprising about 40–60% cis-1,4 units, about 60–40% vinyl units, and less than about 10% trans-1,4 units, is produced by polymerizing isoprene with a catalyst system consisting essentially of an organic magnesium compound such as phenylmagnesium bromide, and a cobalt compound such as the hexahydrate of cobalt silicofluoride, in the optional presence of an accelerator such as water or an alcohol.

---

This invention relates generally to the polymerization and copolymerization of conjugated dienes, and particularly to polybutadiene, polyisoprene and butadiene-isoprene copolymers having a high proportion of cis-1,4 and vinyl units along with the processes and catalytic compositions for obtaining the polymers and copolymers.

Processes and catalytic compositions for the polymerization and copolymerization of conjugated dienes are known in the prior art, such as those disclosed in Kirk and Othmer, "Encyclopedia of Chemical Technology," second supplement (1960), pp. 771, 772, 774, 775, 777, 780 and 783. According to the prior art as disclosed in Kirk and Othmer, "Encyclopedia of Chemical Technology," 2nd edition (1964), vol. 3, pp. 784–815, particularly pp. 787–788 and the reference material cited therein, 1,3-butadiene is readily polymerized to structures corresponding to the cis-1,4, trans-1,4 and 1,2 addition of the monomer.

Polymers of butadiene consisting essentially of trans-1,4 units are known in the prior art, such as those disclosed in the article of Natta, Chim. Ind., vol. 42, p. 1207 (1960). Mixed cis and trans polymer addition products of butadiene are also known, such as those disclosed in the article of Gaylord et al. in the Journal of Polymer Science, vol. 28, p. 450 (1958). Polybutadiene containing more than 85% cis-1,4 structure is disclosed in Belgian Patent No. 549,554. Adams et al. have disclosed in Industrial and Engineering Chemistry, vol. 50, p. 1507 (1958), the preparation of polyisoprene consisting essentially of cis-1,4 polymer, trans-1,4 polymer and equal proportions of cis-1,4 and trans-1,4 polymer.

It is, therefore, an object of the present invention to obtain polymers and copolymers of conjugated dienes having a high proportion of cis-1,4 and vinyl units.

Other objects of the present invention are improved catalyst compositions for polymerizing conjugated dienes.

Still other objects of the present invention are improved processes for polymerizing conjugated dienes.

Another object of the present invention is a polymer of a conjugated diene consisting essentially of cis-1,4 and vinyl units in equal proportions.

Upon further study of the specification and claims other objects and advantages of the present invention will become apparent.

In the present invention conjugated aliphatic dienes having 4 to 8 carbon atoms are polymerized or copolymerized to a structural configuration containing generally from 30 to 70% of cis-1,4 units, 70 to 30% of vinyl units, and less than 15% of trans-1,4 units.

A preferred form of this invention comprises polymers of isoprene containing from 40 to 60% of cis-1,4 units, from 60 to 40% of vinyl units, and less than 10% of trans-1,4 units.

Through a thorough physical study of the polymers obtained, it has been shown that the particularly interesting elastomeric properties of these polymers result from the practically regular alternation of the cis-1,4 addition units with the vinyl-3,4 units (or 1,2 in the case of polymers of butadiene).

As will be seen from the examples below, the ratio of these two structures remains substantially constant and approximately equal to one.

The polymers and copolymers of the present invention are useful as elastomers for certain purposes and advantageously replace known rubbers of the natural or synthetic polydiene types.

The presence of good elastomeric properties in the products of this invention is a surprising discovery, since until the present invention such properties have been found only in polymers of conjugated dienes containing a very high percentage, for example, more than 85%, of cis-1,4 or vinyl units. The polymers of the prior art which are less rich in these units, and especially those with less than 70% of cis-1,4 units, have always shown only mediocre elastomeric properties.

The polymers and copolymers of the present invention are obtained by bringing at least one conjugated diolefin into contact with an initiating system obtained by reacting;

(a) An organic magnesium compound of the formula $R_2Mg$ or $R_2Mg$, $MgX_2$ (which can be written more simply as $RMgX$) in which R is a monovalent hydrocarbon radical containing preferably from 1 to 20 carbon atoms, and X is a halogen, with (b) A cobalt compound.

The hydrocarbon group represented by R is the above formula containing preferably up to 20 carbon atoms includes such moieties as saturated and unsaturated alkyl, cycloalkyl, cycloalkenyl, aryl, aralkyl and alkaryl, wherein the aryl radicals have 1 to 3 rings.

Preferred examples of organic magnesium compounds useful for the present invention comprise methylmagnesium chloride or bromide, ethylmagnesium chloride, n-propylmagnesium chloride, tert.-butylmagnesium bromide, hexylmagnesium bromide, n-dodecylmagnesium chloride, allylmagnesium chloride, cyclohexylmagnesium chloride, benzylmagnesium bromide, cyclohexenylmagnesium chloride, phenylmagnesium chloride, phenylmagnesium bromide, phenylmagnesium iodide, allylmagnesium bromide, butadienylmagnesium chloride, tolylmagnesium bromide, amylmagnesium chloride, butylmagnesium iodide, vinylmagnesium chloride, p-tolylmagnesium chloride, indenylmagnesium bromide, naphthylmagnesium iodide, and butylmagnesium fluoride.

In the preferred method of operation, the organic magnesium compound is prepared directly in a hydrocarbon solvent, or it is obtained from a compound prepared in a solvent medium, such as diethyl ether, by displacement of the solvation molecules in the presence of the hydrocarbon.

The other catalyst compound is a cobalt derivative, which is, for example, a salt of a mineral acid or of an organic acid, preferably one that is soluble in the reaction mixture. Examples of such cobalt derivatives are the chloride, bromide, fluoride, iodide, nitrate, sulfate, silicofluoride, oleate, naphthenate and acetylacetonate of cobalt. Other examples of the cobalt derivatives are the oxyhalides, the hydroxyhalides, the acetates, the oxalates, the tartrates, the carbonyls, the nitrosyls and any other cobalt compound known in the art.

The valence of cobalt in said compound is of no significance.

In the preferred method of operation the cobalt salts are used in their purified form, for example, with their water of crystallization removed by heating under vacuum. Use is also made of cobalt salts which are complexed with basic molecules such as amines, ethers or alcohols.

The preferred cobalt compounds are the halides, and particularly the fluoride and the iodide, which confer an especially increased activity to the catalytic system.

The molecular ratio of the organic magnesium compounds and the cobalt derivatives contained in the initiator system is usually between 0.25/1 and 10/1, preferably between 1/1 and 3/1, but is not restricted to these limits.

Whereas this invention embraces the broad combination of organic magnesium and cobalt compounds as previously indicated, the preferred specific combinations include: phenylmagnesium bromide, and hexahydrate of cobalt silicofluoride, phenylmagnesium bromide and cobalt fluoride, allylmagnesium chloride and trivalent cobalt acetylacetone, benzylmagnesium bromide and cobalt iodide, benzylmagnesium bromide and cobalt chloride, phenylmagnesium bromide and cobalt iodide, phenylmagnesium bromide and cobalt chloride, butylmagnesium chloride and cobalt iodide.

The concentration of the initiator or catalyst used in this process is varied within wide limits. The proportion of the cobalt derivative is generally between 2.5 and 200 millimoles per 100 grams of diolefin being polymerized, and for the preparation of rubbery polymers the amount generally does not exceed 50 millimoles. The actual amount of initiator is generally determined by the desired molecular weight of the desired product.

The liquid medium in which the catalyst is formed by the combination of one or more organic magnesium compounds and cobalt derivatives, and the liquid medium in which polymerization is then effected, are preferably composed substantially of saturated aliphatic, cycloaliphatic and/or aromatic hydrocarbons, such as hexane, pentane, heptane, isooctane, cyclohexane, benzene and/or toluene. Other examples of the liquid medium are: chlorobenzene, methylene chloride, and decahydronaphthalene.

Polymerization is preferably performed in the presence of an aromatic hydrocarbon or a mixture of paraffinic and aromatic hydrocarbons. The applicants have found that the rate of polymerization can be remarkably accelerated by a controlled addition of small amounts of an oxygen-containing compound such as a monohydric, a polyhydric or a polyfunctional alcohol or water without modifying to any extent the structure of the polymer. This accelerating effect is observed for molar ratios, for example, of alcohol or water/organic magnesium compounds, of from 0.1:1 to 1.1:1, the maximum effects occurring with ratios between 0.7 and 1.

The alcohol that is used should preferably have the formula R—OH where R is an alkyl, alkenyl, cycloalkyl, cycloalkenyl or aralkyl radical containing 1 to 24 carbon atoms, for example, methanol, ethanol, isobutanol, n-dodecanol, cyclohexanol, cyclohexenol, allylol, benzhydrol, benzylol, n-octanol and tert.-butanol.

The oxygen-containing compounds, especially the alcohols or water, are added to the reaction mixture either as such or in combination with one of the reactants, for example, in the form of water or alcohol of crystallization.

It has been found that it is advantageous to use an alcohol with 6 to 30 carbon atoms. Not only is the yield of polymer thereby increased, but a homogeneous catalyst is then used with all the usual advantages of polymerization in solution. In this connection, alcohols having 7–10 carbon atoms are particularly effective.

The polymerization process of the present invention can be carried out at temperatures, for example, between $-20°$ and $+100°$ C. It is preferred to use temperatures between 25 and 75° C. although higher or lower temperatures are also useful.

The process of these present invention is applicable to the polymerization of any conjugated diene containing, for example, 4 to 7 carbon atoms. It is especially suitable for the polymerization of butadiene and isoprene, since these dienes polymerize very readily and quickly under the conditions of the invention. Examples of other conjugated dienes useful in the invention are piperylene, chloroprene, 1-phenyl-1,3-butadiene, 1-cyano-1,3-butadiene, 2,4-dinitro-1,3-butadiene, 1,4-dimethylbutadiene.

It is possible by this invention not only to polymerize any conjugated diene by itself, but the invention is also useful for the copolymerization of two or more conjugated dienes such as isoprene and butadiene, and also for the copolymerization of one or more conjugated dienes with other ethylenically unsaturated compounds, for example, styrene, isobutene, propylene, methylmethacrylate or acrylonitrile. Such compounds are preferably mono-α-ethylenically unsaturated.

The following copolymers are representative of the copolymers of the present invention: butadiene-isoprene, butadiene-styrene, butadiene-piperylene, isoprene-acrylonitrile.

The results of the polymerization also depend on the age of the catalyst, namely the time prior to the polymerization during which the cobalt compounds are allowed to react with the organic magnesium compounds. The temperature is also important, especially when the components of the catalyst are brought into contact, in the presence of a diolefin, at a temperature below 0° C., and preferably below $-20°$ C., and kept at this temperature at least one hour, for example, 12 hours, before being subjected to polymerization conditions. It is possible in this way to obtain subsequent polymerization at increased speed and with increase in the average molecular weight of the polymer.

The ageing of the catalyst is realized by bringing the catalytic system into contact at a low temperature with a small fraction of the monomer before polymerization. In a particular example, 1 to 5 moles of the diolefin are added per mole of the cobalt halide, and the main portion of the diolefin is added later.

This does not alter the fact that a very fresh catalyst also gives excellent results. A catalyst is said to be fresh when the monomer to be polymerized comes into contact with the components of the catalyst or with the catalyst that is ready to be used, either before, during, or immediately after the components of the catalyst have combined.

The polymerization reaction is carried out under autogenous pressure or any suitable pressure that is sufficient to keep the reaction mixture effectively in the liquid phase. The pressure depends on the particular diluent used and on the temperature at which the polymerization is performed. Elevated pressures are, however, maintained by any suitable procedure, such as the pressurization of the reactor with a gas which is inert in the presence of the polymerization reaction.

Separate charges are used in performing the method of the present invention by introducing the diolefin monomers into a reactor that already contains the initiator and the diluent. Although the components of the reaction mixture are added in any desired order, it is often best to add the monomers, the cobalt compounds, and subsequently the oxygen-containing cocatalyst before the organic magnesium compounds are added.

With this invention it is possible to perform the initiating step by mixing the ingredients in a vessel separate from the preparation of the catalyst or the initiator. The resulting mixture, or the catalyst itself, is then introduced into the reactor containing the monomer and the diluent, or the monomer is introduced after the initiator. The method of this invention is performed continuously by maintaining in the reactor the reactant concentrations mentioned below during a suitable dwell time. The dwell time in a continuous process varies in an important manner according to the variables such as the temperature, the pressure, the ratio of the catalyst components and the concentration of the catalyst. In a continuous process the dwell time is usually between 1 second and 10 hours or more when the conditions are within the limits specified above. In a process using separate charges, the duration of the reaction is generally between 3 and 24 hours, but can be as much as 100 hours or more.

It is known that many substances when they are not used in controlled quantities as indicated above, exercise a harmful effect on the activity of the catalyst of the present invention. These substances comprise, among others, carbon dioxide, oxygen and water. It is then generally desirable that the reactants should not contain these substances or other substances which could have a tendency to inactivate the catalyst. Any method can be used for eliminating such substances. If a diluent is used in this process, then it should be substantailly free from impurities such as water, oxygen and analogous substances. It is also desirable to expel the air and the humidity from the reactor in which the polymerization is to be performed.

It will be seen from what follows that the method of this invention offers many possibilities unknown to the prior art.

The variable conditions are—the choice of components of the catalyst system, the concentrations, the choice of the medium, if desired, also the ratio of the aliphatic hydrocarbons to the aromatic hydrocarbons, the age of the catalyst as determined by the time during which the components of the catalyst act upon one another prior to polymerization, their temperature during this ageing process, the temperature and pressure during polymerization, and finally the choice and/or proportions of the monomers. This process is, therefore, readily adapted even when the nature of the product and the speed of polymerization conforms to strict and variable conditions.

When the polymerization is finished and the ingredients are to be separated, the entire mixture is treated to inactivate the initiator and recover the rubbery product.

Any suitable process can be used for treating this reaction mixture.

In one of these processes the polymer is recovered by steam distillation of the diluent which it contains. In another suitable process, a substance such as an alcohol and/or water is added to the mixture to inactivate the catalyst and to precipitate the polymer. The polymer is then separated from the alcohol and from the diluent by any suitable method, such as decantation or filtration. It is often preferred to add initially only enough of the catalyst inactivator to inactivate the latter without causing precipitation of the polymer. It has also been found that it is advantageous to add an antioxidant such as β-phenylnaphthylamine or p-tert.-butylcresol to the polymer solution before recovering the polymer. After the addition of the catalyst inactivator and the antioxidant, the polymer is separated continuously from the solution by adding an excess of a substance such as ethyl or isopropyl alcohol. It is also advantageous to add to the alcohol, during precipitation of the polymer, a complexing agent for the catalyst metals, such as acetylacetone which makes it readily possible to obtain a polymer that is free from any metallic residue.

Other suitable methods for recovering the polymer in the solution are included in the concept of the present invention. After the polymer has been separated from the alcohol and from the diluent by filtration or other methods, the polymer is dried.

The polymers obtained by the present invention vary from liquid to a rubbery consistency. They have an intrinsic viscosity of about 0.1 to 10, and preferably about 2 to 4, as measured in 2, 1.5, 1 and 0.5% toluene solutions at 30° C.

The molecular weights corresponding to the intrinsic viscosity ranges are about 4,000 to 10,000,000, with the preferred range being 250,000 to 600,000.

The polymers are suitable for mixing with various other ingredients by making use of different methods of the prior art for mixing natural and synthetic rubbers with other ingredients. The rubbers of the present invention are mixed with vulcanization accelerators, vulcanizing agents, reinforcing agents, and additives identical with those used for natural rubbers. The polymers of the present invention are also mixed with other polymerized substances such as natural rubber, cis-1,4-polybutadiene, polyethylene and analogous products.

As has already been mentioned, the polymers and copolymers of the present invention have cis-1,4 and vinyl structures in such amounts to give them properties which make them suitable for the same purposes for which natural rubbers or synthetic elastomers are used.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Examples 1 to 8

Isoprene is polymerized during a series of experiments by using phenylmagnesium bromide in solution in toluene and the hexahydrate of cobalt silicofluoride as the initiator system. The formula is as follows:

Isoprene _____ 3.6 moles/liter.
Diluent _____ Toluene.
$C_6H_5MgBr$ and $CoSiF_6 \cdot 6H_2O$:
    Temperature _____ 40° C.
    Time _____ Variable.

The cobalt silicofluoride is introduced into the reactor, whereupon the latter is flushed with nitrogen. Toluene and isoprene are then added, and finally the phenylmagnesium bromide dissolved in toluene. The reaction mixture is then agitated in a thermostatic bath at 40° C. At the end of each reaction the mixture is treated with ethyl alcohol containing 1 part by weight of tert. butylcresol per 100 parts of the polymer, to serve as an antioxidant and to inactivate the catalyst. The polymer is then precipitated with isopropyl alcohol containing 0.5 part acetylacetone per 100 parts by weight of alcohol, and is then dried at 60° C. under vacuum to constant weight. The percentage of vinyl units is calculated by the method of Binder, based on the infrared spectrum of its 0.25% by weight solution in carbon disulfide. The percentage of linear units is determined by magnetic nuclear resonance on 2.5% by weight solutions thereof in benzene.

The intrinsic viscosities $\eta$ are measured in toluene solutions at 30° C.

The results are given in the following table:

TABLE I.—INFLUENCE OF THE MOLAR RATIO $C_6H_5MgBr/CoSiF_6 \cdot 6H_2O$ $[CoSiF_6 \cdot 6H_2O] = 3.5 \cdot 10^{-2}$ mole/liter Time: 17 hours

| Example No. | Molar ratio, Mg/Co | Percent Conversion | Cis-1,4 | 3,4 | $[\eta]$ |
|---|---|---|---|---|---|
| 1 | 3.5 | 13 | 42 | 48 | 0.7 |
| 2 | 4.0 | 23 | | | |
| 3 | 5.0 | 38 | | | |
| 4 | 6.5 | 46 | 48 | 46 | 0.6 |
| 5 | 8.0 | 32 | 51 | 42 | 0.3 |

TABLE II.—INFLUENCE OF THE CONCENTRATION OF $CoSiF_6 \cdot 6H_2O$

Molar ratio: $C_6H_5MgBr/CoSiF_6 \cdot 6H_2O = 6$

Time: 24 hours

| Example No. | $[CoSiF_6 \cdot 6H_2O]$ $10^{-2}$ mole/l. | Percent Conversion | Cis-1,4 | 3,4 | $[\eta]$ |
|---|---|---|---|---|---|
| 6 | 0.71 | 16 | 44 | 48 | 0.6 |
| 7 | 1.43 | 32 | 42 | 50 | 0.5 |
| 8 | 2.14 | 39 | 46 | 45 | 0.6 |

Examples 9 to 27

The influence of various factors on the rate of polymerization of isoprene, determined by chromatographic dosage of the residual monomer in the reaction medium, in the presence of the catalytic system formed by the dehydrated cobalt fluoride and the phenylmagnesium bromide has been studied in a series of experiments assembled in Tables III to VI. In each case the concentration of the isoprene is equal to 2 mols/liter and the diluent is benzene.

Whatever may be the conditions of the reaction, the microstructure of the polyisoprene obtained always comprises 40 to 50% of 3,4-vinyl units, the remaining unsaturated parts being essentially of the 1,4-cis linear type.

TABLE III.—VARIATION OF THE RATE OF POLYCONDENSATION OF THE ISOPRENE AS A FUNCTION OF THE MOLAR RATIO $C_6H_5MgBr/CoF_2$ $[CoF_2] = 5 \cdot 10^{-2}$ mole/liter
Molar ratio: $CH_3OH/C_6H_5MgBr = 0.9$
Temperature: 50° C.

| Example No. | Molar ratio, Mg/Co | Rate, $10^4$ mole/l./mn. | $[\eta]$ |
|---|---|---|---|
| 9 | 1.0 | 3.4 | 1.05 |
| 10 | 1.5 | 25 | 1.18 |
| 11 | 1.7 | 32 | |
| 12 | 2.0 | 40 | |
| 13 | 2.5 | 56 | 1.16 |
| 14 | 3.0 | 53 | |

TABLE IV.—VARIATION OF THE SPEED OF POLYMERIZATION OF ISOPRENE AS A FUNCTION OF THE AMOUNT OF ALCOHOL ADDED AS COCATALYST.

Molar ratio: $C_6H_5MgBr/CoF_2 = 1$
$[CoF_2] = 5 \cdot 10^{-2}$ mole/liter
Temperature: 50° C.

| Example No. | Molar ratio, $CH_3OH/C_6H_5MgBr$ | Rate, $10^4$ mole/l./mn. |
|---|---|---|
| 15 | 0.50 | 3 |
| 16 | 0.75 | 25 |
| 17 | 0.90 | 48 |
| 18 | 1.00 | 40 |
| 19 | 1.10 | 0 |

TABLE V.—VARIATION OF THE SPEED OF POLYMERIZATION OF ISOPRENE AS A FUNCTION OF THE CONCENTRATION OF THE CATALYST

Molar ratio:
$C_6H_5MgBr/CoF_2 = 2.2$
$CH_3OH/C_6H_5MgBr = 0.9$
Temperature: 50° C.

| Example No. | $[CoF_2] 10^2$ mole/l. | Rate, $10^4$ mole/l./mn. | $[\eta]$ |
|---|---|---|---|
| 20 | 1.25 | 0 | |
| 21 | 2.50 | 5.5 | 1.58 |
| 22 | 5.00 | 100 | 1.35 |
| 23 | 7.50 | 120 | |
| 24 | 11.40 | 177 | 0.64 |

TABLE VI.—VARIATION OF THE SPEED OF POLYMERIZATION OF ISOPRENE AS A FUNCTION OF THE TEMPERATURE.

$[CoF_2] = 5 \cdot 10^{-2}$ mole/liter
Molar ratios of $C_6H_5MgBr/CoF_2$ and $CH_3OH/C_6H_5MgBr$, the same as in Table V.

| Example No. | T, ° C. | Rate, $10^4$ mole/l./mn. | $[\eta]$ |
|---|---|---|---|
| 25 | 50 | 100 | 1.35 |
| 26 | 40 | 49 | 1.30 |
| 27 | 30 | 9 | 2.28 |

Example 28

0.121 g. $CoF_2$ is introduced into a reactor under an inert atmosphere. There is then added at —60° C. 10 cm.³ toluene, 0.032 g. methyl alcohol, 2.7 g. butadiene and 4.4 cm.³ of a solution of 0.63 mole/liter phenylmagnesium bromide in benzene. The reaction mixture is kept at —20° C. for 16 hours and is then agitated in a thermostatically controlled bath at 55° C. for 7 hours. 1.7 g. polybutadiene are obtained with an intrinsic viscosity equal to 0.95 and a microstructure consisting of 66% cis-1,4 units, 30% vinyl units and 4% trans-1,4 units.

Example 29

Into a reactor at —60° C. are added 0.121 g. $CoF_2$, 0.032 g. methyl alcohol, 2.7 g. butadiene and 3.4 g. isoprene, followed by 6.5 cm.³ of a solution of 0.48 mole/liter of phenylmagnesium bromide in toluene. After 16 hours at —30° C. and 7 hours at 55° C., 1.9 g. of an elastomeric copolymer are obtained with an intrinsic viscosity equal to 0.87. According to infrared spectrometry, the copolymer, consists principally of vinyl units, and contains 43% isoprene-3,4, 37% cis-1,4 isoprene and 20% vinyl polybutadiene.

Example 30

180 cm.³ of a 0.25 molar solution of allylmagnesium chloride in diethyl ether are mixed at —60° C. with a suspension of 3.56 g. of trivalent cobalt acetylacetonate in 50 cm.³ diethyl ether. After agitating the mixture 3 hours, the ether is evaporated under vacuum at the same temperature.

The residue is extracted by pentane at the same temperature. By refrigeration to —80° C., crystals are obtained which are dried under vacuum at —60° C.

These crystals of triallyl cobalt are dissolved in pentane to obtain a 0.2 mole/liter solution at −60° C.

To 2 cm.³ of this solution, 6.8 g. isoprene are added. After agitation of the mixture 21 hours at 55° C., 0.95 g. polyisoprene is obtained, consisting of 40% cis-1,4 units and 60% 3,4 units.

Example 31

Into a reactor under an inert atmosphere are introduced—

| | |
|---|---|
| CoI₂ _____g__ | 0.391 |
| Methyl alcohol in solution in 3 cm.³ toluene __g__ | 0.032 |
| Isoprene _____g__ | 3.4 | and

| | |
|---|---|
| Solution of 0.43 mole/liter of phenylmagnesium bromide in toluene _____cm.³__ | 7 |

The mixture is allowed to stand 32 hours at −20° C. and then polymerized 7 hours at 55° C.

2.1 g. polyisoprene are obtained which has a viscosity of 1.35 dl./g., measured at 30° C. in benzene.

The polymer comprises 55% vinyl-3,4 units and 45% linear cis-1,4 units.

In a similar experiment in which the cobalt diodide was replaced by cobalt chloride while all other conditions remained the same, the following results are obtained.

| | |
|---|---|
| Weight of the polymer _____g__ | 0.5 |
| Viscosity _____dl./g__ | 1.20 |
| Structure: | |
|   Vinyl-3,4 units _____percent__ | 48 |
|   Cis-1,4 units _____do____ | 50 |
|   Vinyl-1,2 units _____do____ | 2 |

In the case of cobalt bromide, there is obtained only 0.31 polyisoprene having an intrinsic viscosity of 0.75 dl./g. and with a microstructure identical with that obtained with cobalt chloride.

Example 32

Example 31 is repeated by using benzylmagnesium bromide in place of phenylmagnesium bromide.

3 g. of polymer containing 53% vinyl-3,4 units and 47% linear cis-1,4 units are obtained.

The intrinsic viscosity measured at 30° C. in benzene is equal to 0.44 dl./g.

Example 33

The experiment with cobalt iodide described in Example 31 is repeated, but n-octyl alcohol is substituted for the methyl alcohol. The medium is essentially homogeneous.

All other conditions remaining the same, the yield is 2.5 g. polymer comprising:

| | Percent |
|---|---|
| Cis-1,4 units _____ | 43 |
| Vinyl-3,4 units _____ | 56 |
| Vinyl-1,2 units _____ | 1 |

As with tertiary butyl alcohol, 3 g. of polymer of the same structure and with an intrinsic viscosity of 0.2 dl./g. were obtained.

Example 34

A mixture of 2.7 g. butadiene and 3.4 g. isoprene were copolymerized under the same conditions as in Example 31.

The copolymer formed weighed 3.4 g., had an intrinsic viscosity of 0.32 dl./g., and contained—

27% butadiene, consisting essentially of vinyl units
73% isoprene, presenting a ratio of the cis-1,4 units to the vinyl units the same as in Example 31.

Example 35

The following mixture is reacted 6 hours at 30° C.:

0.391 g. CoI₂ in 20 cm.³ ethyl ether 3 cm.³ of a solution of one mole per liter of phenylmagnesium bromide in ethyl ether, and 0.2 g. isoprene.

Half of the ethyl ether is evaporated at −20° C. under reduced pressure, e..g of the order of ⅒ atmosphere. To the residue is added 10 cm.³ pentane.

After decantation, washing with pentane and drying under vacuum, a brownish precipitate is obtained to which is added—

| | |
|---|---|
| Toluene _____cm.³__ | 10 |
| Methyl alcohol _____g___ | 0.032 |
| Isoprene _____g__ | 3.4 |

The reaction mixture is agitated directly at 55° C.

Under these conditions a rate of polymerization is obtained which is comparable with that which has been observed in Example 31 where the catalyst was kept 32 hours at −20° C. before it was used.

The resulting polymer has a microstructure analogous to that of the polymer obtained in Example 31 in the presence of cobalt iodide.

These polymers of this invention always contain more than 90% of unsaturation (determined by the method of Kolthoff, J. of Polymer Science 3, page 71 (1948), and generally more than 95%.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

We claim:

1. A polymerization process for preparing a polyisoprene having a substantially regular chain of vinyl and cis-1,4 units, comprising about 40 to 60% cis-1,4 units, about 60 to 40% vinyl units, and less than about 10% trans-1,4 units, comprising contacting isoprene with a catalyst system comprising a mixture of an organic magnesium compound and a cobalt compound.

2. The process of claim 1, wherein said organic magnesium compound is selected from the group consisting of RMgX and R₂Mg, wherein R is a monovalent hydrocarbon group consisting from 1 to 20 carbon atoms and X is a halogen.

3. The process of claim 2, wherein said cobalt compound is selected from the group consisting of cobalt salts of organic and inorganic acids.

4. The process of claim 3, wherein the molar ratio of said magnesium compound to said cobalt compound is between about 0.25/1 and 10/1.

5. The process of claim 3, wherein the molar ratio of said magnesium compound to said cobalt compound is between about 1/1 and 3/1.

6. The process of claim 3, wherein about 0.25 to 20 millimoles of said cobalt compound are used per 10 grams of isoprene.

7. The process of claim 1, further comprising the addition of catalytic amounts of compounds selected from the group consisting of alcohol and water.

8. The process of claim 7, wherein said catalytic amounts are between about 0.7 and 1 mole per mole of said organic magnesium compound.

9. The process of claim 7, wherein said alcohol has from 6 to 30 carbon atoms.

10. The process of claim 1, wherein the polymerization is carried out at a temperature between about −20 and 100° C.

11. The process of claim 1, wherein the polymerization is carried out at a temperature between about 25 and 75° C.

12. The process of claim 1, wherein said organic magnesium compound and said cobalt compound coreact and the reaction product is placed in contact with said isoprene.

13. The process of claim 1, wherein said organic magnesium compound and said cobalt compound coreact in the presence of said isoprene.

14. The process of claim 13, wherein 1 to 5 mols of said isoprene per mol of cobalt compound are in contact with said catalyst system at a non-polymerization temperature below −20° C. (0° C.) and for a period of at least 1 hour, additional isoprene is thereafter added, and the mixture is then brought to a polymerization temperature.

15. The process of claim 1, wherein said cobalt compound is cobalt iodide.

References Cited
UNITED STATES PATENTS

| | | | |
|---|---|---|---|
| 3,147,237 | 9/1964 | Longiave et al. | 260—82.1 |
| 3,223,693 | 12/1965 | Farrar | 260—94.3 |
| 3,271,381 | 9/1966 | Andersen et al. | 260—94.9 |
| 3,336,280 | 8/1967 | Naylor | 260—94.3 |

JOSEPH L. SCHOFER, *Primary Examiner.*

J. C. HAIGHT, *Assistant Examiner.*

U.S. Cl. X.R.

252—429, 431; 260—80.7, 82.1, 82.3, 83.5, 83.7, 84.1, 85.3

UNITED STATES PATENT OFFICE
CERTIFICATE OF CORRECTION

Patent No. 3,448,095           Dated June 3, 1969

Inventor(s) FRANCOIS DAWANS, et al

It is certified that error appears in the above-identified patent and that said Letters Patent are hereby corrected as shown below:

Column 7, Line 36, Example No. 6, change "0.6" to ---0.5---

Column 7, Line 37, Example No. 7, change "0.5" to ---0.6---

SIGNED AND
SEALED
OCT 20 1970

(SEAL)
Attest:

Edward M. Fletcher, Jr.
Attesting Officer

WILLIAM E. SCHUYLER, JR.
Commissioner of Patents

FORM PO-1050 (10-69)       USCOMM-DC 60376-P69